UNITED STATES PATENT OFFICE.

MAURICE FRISCHER, OF 94 HIGHBURY NEW PARK, COUNTY OF MIDDLESEX, ENGLAND.

BISCUIT.

SPECIFICATION forming part of Letters Patent No. 392,507, dated November 6, 1888.

Application filed November 29, 1887. Serial No. 256,420. (No specimens.) Patented in England December 15, 1887, No. 17,268.

*To all whom it may concern:*

Be it known that I, MAURICE FRISCHER, a subject of the Queen of Great Britain, residing at 94 Highbury New Park, in the county of Middlesex, England, have invented a new and useful Composition of Matter to be Used as a Preserved Food, of which the following is a specification.

My composition consists of the following ingredients, combined in the proportions stated, viz: Flour, fifty parts; common salt, two parts; pepper or paprika, 0.3 to 0.5 parts; garlic, finely ground, two parts; bullock's blood, four parts; eggs, one part.

The chief constituent of the composition is flour, the salt, pepper or paprika, and garlic being added for seasoning and flavoring, while the bullock's blood and egg serve to bind the ingredients together. If desired, the garlic may be dispensed with. The blood is taken from the slaughtered beast in a liquid state in a clean vessel, and well stirred therein, and immediately before being used is poured into another clean vessel. It should generally be used before the lapse of forty-eight hours from the time the beast was slaughtered. The various ingredients, after being well kneaded together into a paste, are rolled into sheets of any convenient size and of about three millimeters in thickness. The sheets are then powdered with flour to prevent their sticking, after which they are preferably cut into strips somewhat resembling the shape of maccaroni; or they may be ground down to any suitable degree of fineness.

The product, when cooked with water in the usual way or roasted or fried with onions and fat, or made into a soup, or otherwise prepared, forms a wholesome, palatable, and nutritious preserved food. One essential advantage is that it can be kept for a considerable time without deterioration and without being hermetically closed, particularly in dry places.

I am aware that flour and salt have been used in preparing articles of preserved food—such as water-crackers—and I am also aware that dog-biscuits are made, which consist of blood and meat chopped up fine and mixed with meal, and that blood enters largely into the composition of blood-puddings, which also are seasoned with pepper, but which are very perishable. My food-composition is, however, intended for use as an army-biscuit. The blood and egg are used in small quantity to bind the flour together, so that the biscuit is not so friable as water-crackers, which soon rub to cracker-dust if carried, and it is also far more palatable.

What I desire to secure by Letters Patent of the United States of America is—

The hereinbefore-described army-biscuit, consisting of flour, common salt, pepper, garlic finely ground, bullock's blood, and egg, substantially in the proportions specified.

MAURICE FRISCHER.

Witnesses:
 SHIRLEY BOWDEN,
 WALTER J. SKERTEN,
*Southampton Buildings, Chancery Lane, London.*